UNITED STATES PATENT OFFICE 2,122,107

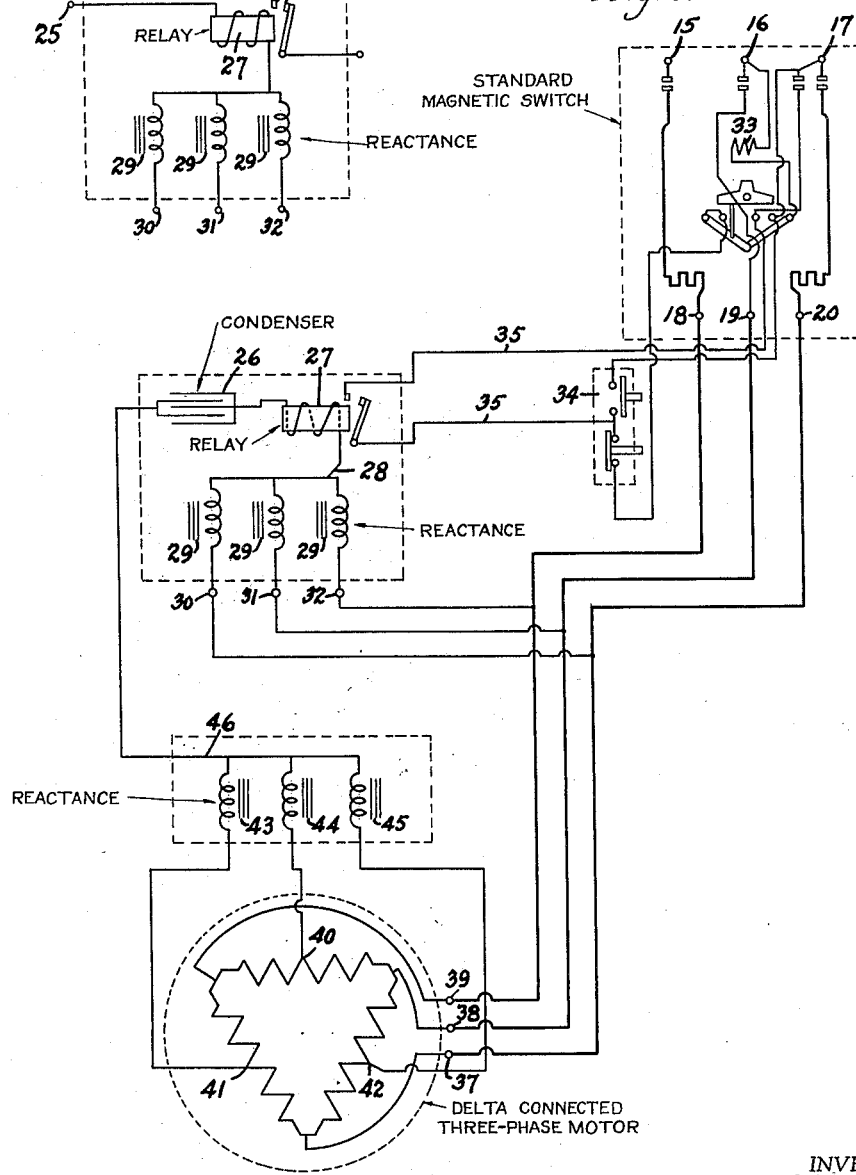

PROTECTING THREE-PHASE APPARATUS

Louis J. Meller and Keith H. Miner, Huntington Park, Calif.; said Miner assignor to said Meller Application February 5, 1935, Serial No. 5,132

6 Claims. (Cl. 175—294)

Our invention relates generally to means and arrangements for protecting electrical circuits, and particularly to means which are automatically operable to protect three-phase apparatus such as three-phase motors against the breaking or disconnecting of any one of the three wires of the current supply.

An important object of our invention is to provide means for preventing single-phasing on a three-phase line.

Another important object of our invention is to provide automatically acting electrical means whereby upon the opening or disconnecting of any one of the three wires of a three-phase supply circuit a current is caused to diminish in a secondary circuit whose consequent action electrically and automatically disconnects any magnetic holdin coil such as used on all magnetic switches and starters.

Another important object of our invention is to provide means for disconnecting the current supply on all three of the wires of a three-phase supply should one of the wires become broken or grounded.

Another important object of our invention is to provide automatically acting means for disconnecting the three-phase current supply in the event of an unbalanced condition of the internal resistance or reactance in a three-phase apparatus, particularly in a three-phase motor.

It is another important object of our invention to provide means to protect the windings of a three-phase motor or other three-phase apparatus from burn-outs caused by broken wires or leads to the motor or other apparatus.

Other objects and advantages of our invention will be apparent from a reading of the following description in connection with the drawings, wherein for purposes of illustration we have shown preferred embodiments of our invention.

In the drawings:—

Figure 2 shows a portion of the arrangement shown in Figure 1 which is used with either the three-phase star or delta connected motor.

Figure 3 is a diagrammatic representation of the manner of connecting the invention in an arrangement with a standard delta connected three-phase motor, utilizing reactances in addition to the matter shown in Figures 1 and 2.

Figure 1:
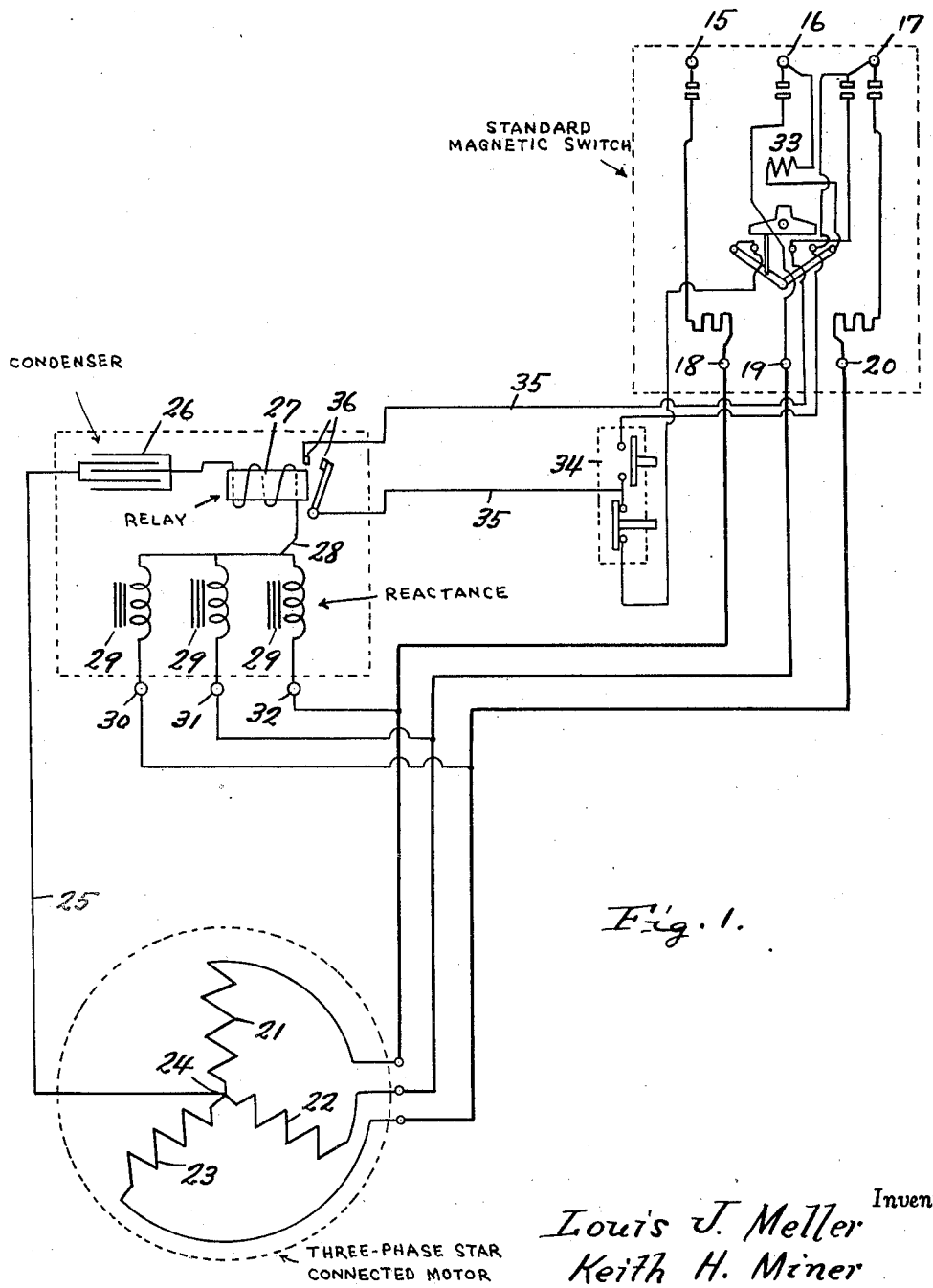
Figure 1 is a general diagrammatic representation of an application of the invention using a standard three-phase magnetic switch in control relation to a motor utilizing the star connection arrangement.

It will be observed that the arrangement shown in Figure 2 is similar in the corresponding part of Figure 1 except that in the arrangement of Figure 2 the condenser is omitted, while included as shown in Figure 1.

Referring in detail to the drawings, wherein like numerals refer to like parts throughout the same, the figures show the connections in accordance with our invention of a magnetic switch and a three-phase motor. The numerals 15 and 16 and 17 designate lines to the source of current supply. The numerals 18, 19 and 20 designate lines leading from the magnetic switch to the motor.

In Figure 1, numerals 21, 22 and 23 designate motor windings, star connected at the center, the center 24 being connected to the wire 25 which leads to the condenser 26. In Figure 3, a wire 46 leads to the condenser 26. Each circuit then proceeds through the relay 27, to 28, the star or electrical center of three balanced reactances 29, whose ends 30, 31 and 32 are connected to the starter load lines 18, 19 and 20. The numeral 33 designates a standard holdin coil. 34 is a standard stop and start push button for the purpose of opening and closing the magnetic holdin coil circuit. 35 is a wire so connected as to be in the magnetic hold in coil circuit when the magnetic switch is in the running position; this circuit will be interrupted by the opening of contacts 36, thus demagnetizing the holdin magnet in the magnetic switch. The contacts 36 are kept closed by the magnetic action of the relay 27 when there is sufficient current flowing in the windings thereof. In Figure 1 when the current supply wires 18, 19 and 20 have current flowing in each wire there is sufficient current flowing between star point 24 through the condenser 26, through the relay 27 to point 28 through reactances 29 thence to the source of supply 18, 19 and 20 to hold contacts 36 closed. The figures show the contacts 36 in their normal open position. The current flowing through the above mentioned circuits is composed almost entirely of the third harmonic along with a small amount of the fundamental component. If an interruption occurs on any one line between the source of supply and wires 18, 19 and 20 there will be a reduction in the third harmonic current flowing between points 24 and 28 in the circuit shown in Figure 1, or a reduction in the third harmonic current flowing between points 46 and 28 in the circuit shown in Figure 3, thus decreasing the magnetism in relay 27 and allowing the contacts 36 to open, thus de-magnetizing the magnetic holdin coil 33, causing the magnetic switch to open and in so doing disconnecting the current supply thereby making it impossible to single-phase the three-phase star connected motor, by the interruption of current or voltage on any one wire.

In Figures 1 and 2, the three reactances 29, and in Figure 3 the three reactances 43, 44 and 45, are shown to be of an inductive nature. However, in accordance with our invention, these impedances are not necessarily reactive, but may be purely ohmic, inductive, capacitative, or of a combined nature.

A condenser 26 is shown in series with a relay 27. This condenser inherently facilitates the flow of the third harmonic component of the current. Figure 2 is the same as the corresponding part of Figure 1 except that the desired ratio of voltage across the relay 27 is obtained without the use of a condenser. The omission of the condenser as shown in Figure 2 is permissible when maximum sensitivity of the protective device is not necessary.

In Figure 3 is shown a delta connected motor. Since it is not possible to find a neutral electrical center in a delta connected motor, we utilize three star-connected reactances 43, 44 and 45, whose other ends are connected respectively to each of the midpoints of the three windings of the motor. Thus the star-point 46 of the three reactances 43, 44 and 45 provides a neutral electrical center similar in characteristics to point 24 of the star connected motor shown in Figure 1. In connecting this delta motor and the three reactances 43, 44 and 45 (Figure 3) to the magnetic switch and the protective device shown in Figure 1, the magnetic switch load lines 18, 19 and 20 are connected to the motor leads 37, 38 and 39. The numerals 40, 41 and 42 designate the midpoints in each of the three phases of the delta motor. Reactance 43 is connected to the electrical center of one phase 42. Reactance 44 is connected to the electrical center of another phase 40. Reactance 45 is connected to the electrical center of the remaining phase 41. The three reactances are star-connected to each other at point 46. A second star-connected impedance bank, shown at 29, which forms a part of the protective device, is connected to the terminals 30, 31 and 32, leading to the terminals 18, 19 and 20. The neutral point 28 of the three impedances 29 is connected in series through the winding of the relay 27 and the condenser 26 to the point 25. This completes the circuit through the magnetic switch and protecting device to the delta connected motor and the three reactances 43, 44 and 45 as shown in Figure 3. There are the same voltage characteristics between point 46 (Figure 3) and point 28 (Figure 1) as there are between point 24 and point 28 (Figure 1) giving the same action of the relay 27. It is possible to remove the reactance 45 and leave 43 and 44 connected as shown without changing the voltage characteristics between 46 (Figure 3) and 28 (Figure 1).

Although we have shown and described herein a preferred embodiment of our invention, it is to be definitely understood that we do not desire to limit the application of the invention thereto, and any change or changes may be made in the materials, and in the structure and arrangement of the parts, within the spirit of the invention and the scope of the subjoined claims.

What is claimed is:—

1. A protective system including a circuit, one end of which is connected to the electrical center of a three-phase apparatus or motor, and which circuit extends through a suitable relay and which circuit continues to a point at the electrical center of a star three-phase balanced impedance whose outer leads are connected respectively to the three wires of a three-phase circuit in parallel with the said apparatus or motor, said relay being so designed as to interrupt the current in a magnetic switch holding coil in the event that there is a change of voltage impressed across the said relay due to the breaking or interruption of any one or more lines supplying current to the said three-phase apparatus or motor, said holding coil being connected in series with the contact points of said relay across one phase of the incoming polyphase power lines.

2. A protective system including a star connected impedance whose outer ends are connected respectively to the three electrical centers of each phase of a delta connected three-phase apparatus or motor, said impedance having its inner ends connected together and a wire continuing from this point and extending through a suitable relay and which circuit continues to a point at the electrical center of a star connected three-phase impedance whose outer leads are connected respectively to the three wires of a three-phase circuit in parallel with the said apparatus or motor, said relay being so designed as to interrupt the current in a magnetic switch holding coil in the event that there is a change of the voltage impressed across the said relay due to the breaking or interruption of any one or more lines supplying current to the aforementioned three-phase apparatus or motor, said holding coil being connected in series with the contact points of said relay across one phase of the incoming polyphase power lines.

3. A protective system including a circuit made up of two balanced impedances whose outer ends are connected respectively to the midpoints of the three-phases of a three-phase, delta connected apparatus or motor, said two balanced impedances having their inner ends connected to each other and to a wire continuing from this point and extending through a suitable relay and which circuit continues to a point at the electrical center of a star connected three-phase impedance whose outer leads are connected respectively to the three-phase circuit in parallel with the said apparatus or motor, said relay being so designed as to interrupt the current in a magnetic switch holding coil in the event that there is a change of the voltage impressed across the said relay due to the breaking or interruption of any one or more lines supplying current to the aforementioned three-phase apparatus or motor, said holding coil being connected in series with the contact points of said relay across one phase of the incoming polyphase power lines.

4. A protective system including a star connected impedance whose outer ends are connected respectively to the three electrical centers of each phase of a delta connected three-phase apparatus or motor, said impedance having its inner ends connected together and a wire continuing from this point and extending through a suitable relay and which circuit continues through a suitable condenser, and which circuit continues to a point at the electrical center of a star connected three-phase impedance whose outer leads are connected respectively to the three wires of a three-phase circuit in parallel with the said apparatus or motor, said relay being so designed as to interrupt the current in a magnetic switch holding coil in the event that there is a change of the voltage impressed across the said relay due to the breaking or interruption of any one or more lines supplying current to the aforementioned three-phase apparatus or motor.

5. A protective system including a circuit made up of two balanced impedances whose outer ends are connected respectively to two points midway in any two phases of the three phases of a three-phase delta connected apparatus or motor, said two balanced impedances being connected to each other and to a wire continuing from this point and continuing through a suitable condenser, and extending through a suitable relay and which circuit continues to a point at the electrical center of a star connected three-phase impedance whose outer leads are connected respectively to the three wires of a three phase circuit in parallel with the said apparatus or motor, said relay being so designed as to interrupt the current in a magnetic switch holding coil in the event that there is a change of the voltage impressed across the said relay due to the breaking or interruption of any one or more lines supplying current to the aforementioned three-phase apparatus or motor, said holding coil being connected in series with the contact points of said relay across one phase of the incoming polyphase power lines.

6. A protector system including a circuit, one end of which is connected to the electrical center or star center of a three-phase star connected apparatus or motor, and which circuit extends through a suitable relay and which circuit continues through a suitable condenser, and which circuit continues to a point at the electrical center of a star connected three-phase balanced impedance whose outer leads are connected respectively to the three wires of a three-phase circuit in parallel with the said apparatus or motor, said relay being so designed as to interrupt the current in a magnetic switch holding coil in the event that there is a change of voltage impressed across the said relay due to the breaking or interruption of any one or more lines supplying current to the said three-phase apparatus or motor, said holding coil being connected in series with the contact points of said relay across one phase of the incoming polyphase power lines.

LOUIS J. MELLER.
KEITH H. MINER.